US006625709B2

(12) United States Patent
Aiken et al.

(10) Patent No.: US 6,625,709 B2
(45) Date of Patent: Sep. 23, 2003

(54) FAIR SHARE DYNAMIC RESOURCE ALLOCATION SCHEME WITH A SAFETY BUFFER

(75) Inventors: Mark A. Aiken, Seattle, WA (US); Ryan O'Donnell, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 09/798,492

(22) Filed: Mar. 2, 2001

(65) Prior Publication Data

US 2002/0053011 A1 May 2, 2002

Related U.S. Application Data

(60) Provisional application No. 60/244,426, filed on Oct. 30, 2000.

(51) Int. Cl.[7] .............................................. G06F 12/00

(52) U.S. Cl. ........................ 711/170; 370/412; 709/104

(58) Field of Search ........................ 711/170, 171–173, 711/129, 152; 710/220, 240; 707/205–206; 709/234, 104; 370/400–420, 229

(56) References Cited

U.S. PATENT DOCUMENTS

| | | | | |
|---|---|---|---|---|
| 5,093,913 A | * | 3/1992 | Bishop et al. | 711/152 |
| 5,361,372 A | * | 11/1994 | Rege et al. | 709/234 |
| 5,541,912 A | * | 7/1996 | Choudhury et al. | 370/412 |
| 5,761,692 A | * | 6/1998 | Ozden et al. | 711/4 |
| 5,826,082 A | * | 10/1998 | Bishop et al. | 709/104 |
| 5,996,013 A | * | 11/1999 | Delp et al. | 709/226 |
| 6,009,275 A | * | 12/1999 | DeKoning et al. | 710/220 |
| 6,047,356 A | * | 4/2000 | Anderson et al. | 711/129 |
| 6,349,312 B1 | * | 2/2002 | Fresko et al. | 707/205 |
| 6,453,376 B1 | * | 9/2002 | Fairman et al. | 710/240 |
| 6,456,590 B1 | * | 9/2002 | Ren et al. | 370/229 |

OTHER PUBLICATIONS

Chang, C.S.; Cruz, R.L., A time varying filtering theory for constrained traffic regulation and dynamic service guarantees, IEEE INFOCOM '99, Conference on Computer Communications. Proceedings. Eighteenth Annual Joint Conference of the IEEE Computer and Communications Societies. The Future is Now Mar. 21–25, 1999 vol. 1, p. 63–70.

Dou, C.; Sheu, J.–S, Performance study of buffer control schemes and cell discard mechanisms in a shared– buffer ATM switch, IEICE Transactions on Communications, May, 1998 vol. E81–B, No. 5, p. 899–909.

Chiussi, F.M.; Xia Ye; Kumar, V.P., Virtual queueing techniques for ABR service: improving ABR/VBR interaction, Proceedings IEEE INFOCOM '97. The Conference on Computer Communications. Sixteenth Annual Joint Conference of the IEEE Computer and Communications Societies. Driving the Information Revolution Apr. 7–12, 1997 vol. 2, p. 406–418.

(List continued on next page.)

Primary Examiner—Donald Sparks
Assistant Examiner—Nasser Moazzami
(74) Attorney, Agent, or Firm—Leydig, Voit & Mayer, Ltd.

(57) ABSTRACT

A dynamic resource allocation scheme is disclosed which allows flexibility in granting resources to a requestor, while maintaining a safety buffer should other requesters need resources. A portion of available resources are declared to be a "safety buffer", and all of the available resources are divided amongst the requesters. The resulting divisions are each requestors "fair share". A requestor is granted resources so long as their resource usage is less than their fair share and so long as there are any available resources. A requestor is also granted resources, even if they are currently exceeding their fair share if the available resources exceed the safety buffer. The application of these two rules results in a dynamic resource allocation scheme which decreases the number of times a request is denied without unfairly limiting the access to resources by other requesters.

45 Claims, 9 Drawing Sheets

OTHER PUBLICATIONS

Choudhury, A.K.; Hahne, E.L., Dynamic queue length thresholds for shared–memory packet switches, IEEE/ACM Transactions on Networking, Apr. 1998 vol. 6, No. 2, p. 130–40.

Tsai, W.J.; Lee, S.Y., Dynamic buffer management for near video–on–demand systems, Multimedia Tools and Applications, 1998 vol. 6, No. 1, p. 61–83.

Popescu, A.; Pruthi, P., Dynamic time sharing: a new approach for congestion management, ATM Networks Performance Modeling and Anylysis 1997 vol. 3 p. 281–301.

Choudhury, A.K.; Hahne, E.L., Dynamic queue length thresholds in a shared memory ATM switch, Proceedings IEEE INFOCOM '96. The Conference on Computer Communications. Fifteenth Annual Joint Conference of the IEEE Computer Societies. Networking the Next Generation Mar. 24–28, 1996 vol. 2, p. 679–87.

Chapter 1 NDIS Intermediate Drivers; Network Drivers Design Guide; MSDN Library—Apr. 2000 Ed.

Technical Committee on Computer Communications of the IEEE Computer Society, Information technology—Telecommunications and information exchange between systems—Local area networks—Media access control (MAC) bridges, International Standard ISO/IEC 10038:1993, ANSI/IEEE Std 802.1D, 1993 edition.

* cited by examiner

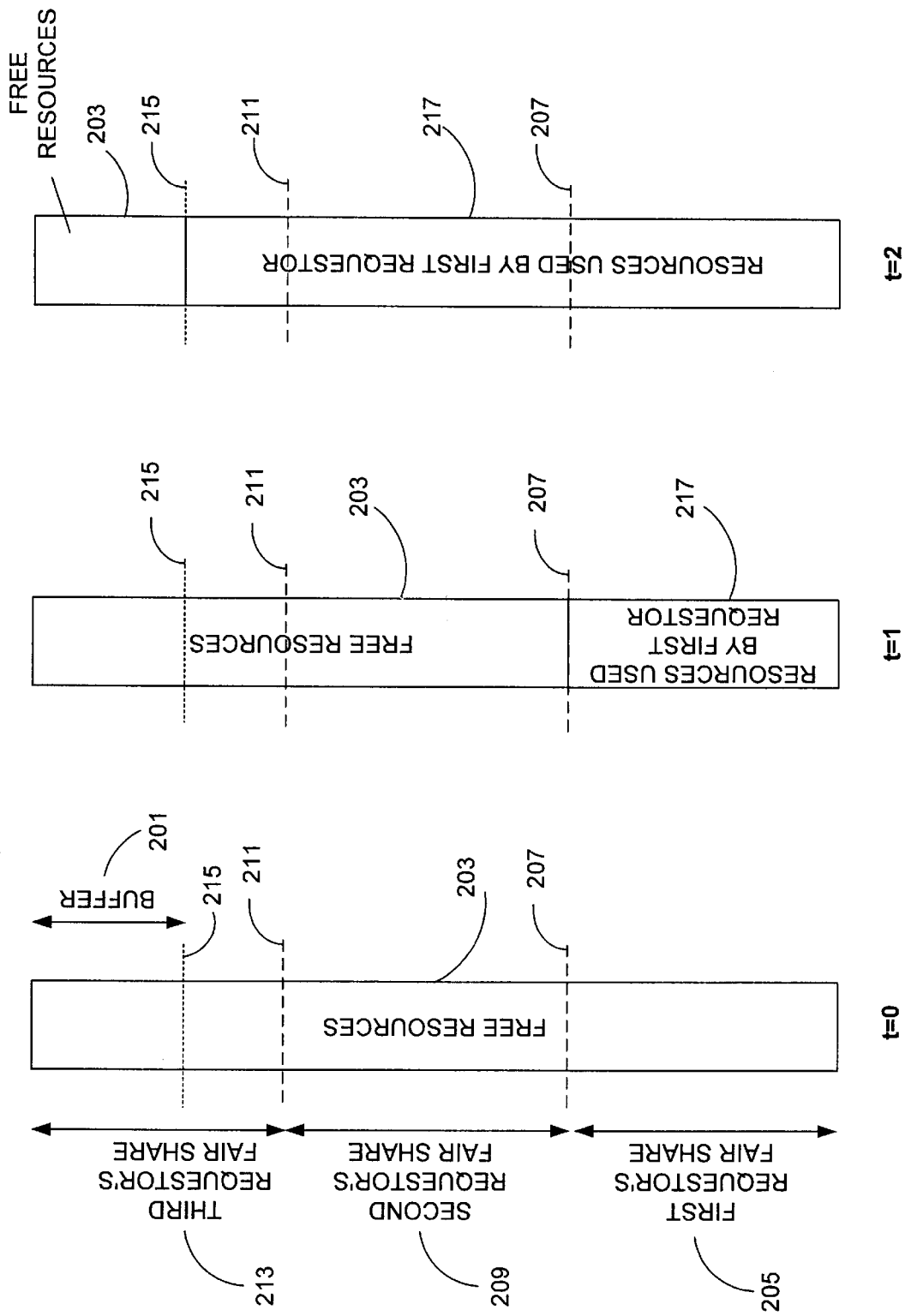

FAIR SHARE DYNAMIC RESOURCE ALLOCATION SCHEME WITH A SAFETY BUFFER

RELATED APPLICATION

This application is related to, and claims priority from, U.S. Provisional Application No. 06/244,426, entitled "Dynamic Resource Allocation Scheme", and filed on Oct. 30, 2000.

TECHNICAL FIELD

This invention relates generally to resource allocation and, more particularly, relates to the allocation of memory among one or more network communication devices.

BACKGROUND OF THE INVENTION

As the complexity of modern computer software increases, ever greater demands are placed on the computer hardware on which this software is run. One such demand is the need for ever increasing Random Access Memory (RAM) space. The computer's memory provides the necessary space for the software to use while it is running on the computer. The memory is used by the computer to store the data required by the software. Varying software programs require varying amounts of memory, and even the same software program may require different amounts of memory at different times during its operational cycle. Software and hardware manufacturers have come up with a number of different schemes to allow computer hardware with limited memory to run software of increasing complexity. One such scheme is known as "virtual memory", and operates by moving data which has not been recently accessed from the limited memory storage to more available hard drive space. One difficulty with such a system is the inefficiency introduced by the transfer of data to and from memory as it is needed by a computer program. Another difficulty is limited speed with which information can be written to and read from a hard drive as compared to the read/write speed of a computer's memory.

To alleviate the need to resort to inefficient schemes such as virtual memory, computer software and hardware manufacturers have attempted to make more efficient use of the existing memory. Because the need for memory can be transient, a dynamic memory allocation scheme can allocate memory from software which does not currently require it to software currently in need of it. The difficulty, however, with such a dynamic memory allocation scheme is selecting an efficient set of rules for granting memory. Should the memory be granted too freely, all of the available memory will be quickly used up, leaving none for other software packages to perform even the most simple of tasks. Should the memory be granted too restrictively, the advantage of a dynamic memory allocation scheme is lost since memory requests will be denied too often, resulting in poor performance.

Dynamic allocation of memory is generally most helpful when the memory requirements are continually changing. For example, network interface devices, such as a network interface card (NIC), require a constantly changing amount of memory to use as a buffer to temporarily store the packets they are sending and receiving. A packet to be sent across a network is placed in the buffer of a NIC. The NIC then reads the data from the buffer and sends it across the network, and the buffer is subsequently cleared to make room for the next packet to be sent. Generally, there is sufficient buffer space to store more than one packet. This allows the software sending the packets to continue sending packets at a steady rate, even if the NIC is not able to always transmit the packets immediately. Should the network become congested, the NIC will transmit the packets at a slower rate, and the packets being sent by the software will be queued in the buffer for transmission at a later time when the network congestion is resolved, and the NIC can resume sending the packets at an optimal rate. When the NIC does resume sending the packets at an optimal rate, it may be able to send the packets faster than they are being added to the buffer by the software, eventually clearing the buffer of all queued packets.

Other subsystems of a modern personal computer likewise have continually changing memory requirements. For example, printer drivers are similar to NICs in their need for an ever changing amount of buffer storage. Given such transient memory requirements, a dynamic memory allocation scheme can increase the efficiency of the memory usage, increasing the amount of memory given to a requester under certain circumstances. However, as stated above, the difficulty with such a dynamic memory allocation scheme is selecting an efficient set of rules for granting memory. It is inefficient to merely grant memory to a first requestor whenever available memory exists, as such a scheme would allow the first requestor to use up all of the available memory, leaving none for a second requestor to use even if it only needed a minimal amount. Conversely, a scheme which would reserve extra memory for the second requester will also be inefficient, because the second requestor may never need the space. It is difficult to properly balance the need to freely grant a memory request with the need to conserve resources for future requests from other sources.

SUMMARY OF THE INVENTION

Accordingly, the present invention provides a method for dynamically allocating resources among different requesters.

The present invention also provides a method for determining when to allocate a resource to a requester.

The present invention additionally provides a system which can grant a disproportionately large amount of resources to a single requestor while maintaining resources in reserve to assure fairness among many requesters.

The invention solves the above difficulties of memory allocation by providing a novel dynamic resource allocation scheme which allows one requestor to be granted a significant part of the available free resources, while maintaining a sufficient safety buffer to satisfy other requestors over a period of time. While the present invention can solve the above memory allocation problems, it is equally useful with any shared resource, such as processor cycles, and the like. Because of the transient nature of some resource requirements, the invention can meet disproportionately large resource requests of limited duration while maintaining overall fairness in the amount of resources provided to each requestor. By maintaining a buffer, the system can temporarily satisfy requests from other requestors. When such other requests increase, the invention can deny continuing requests from a requestor who has been granted too many resources and thereby diminish that requestor's resource consumption and increase the resources available to satisfy the other requests. Thus, the invention minimizes the number of times a request for resources must be denied and thereby facilitates the operation of a software in an environment of limited resources. By minimizing the number of times a request for resources must be denied, the present invention can also increase the network throughput and increases the stability of the entire computer system.

The dynamic resource allocation scheme contemplated by the present invention is based on two simple rules. Initially, the available resources are mathematically divided among the requesters. Each requestor's share is known as that requestor's "fair share". Furthermore, a certain amount of resources, or a percentage of the total resources, are set aside as a "safety buffer". The size of the safety buffer can vary from application to application, depending, among other things, on the nature of the resource requirements of the particular application. The first rule of the scheme contemplated by the present invention is that the requester is granted resources so long as there are resources available and the requestor has not consumed more than its fair share. The second rule is that the requestor is granted resources, even if it has exceeded its fair share, so long as the safety buffer remains unused.

The interaction of these two rules can best be analyzed temporally. Consider the situation where one requestor initially needs a lot of resources. Resources will be granted to it until its fair share is used up. After that, the first requestor will continue to be granted resources, should it need them, until all available resources, minus the safety buffer, are used. Now consider a second requestor which also needs resources. Initially it will be granted the resources from the safety buffer. As the second requestor uses up resources, the safely buffer shrinks, and additional requests from the first requestor will be denied, as some of the safety buffer is now used. As the first requestor frees some of its initial resources, and its requests for additional resources are denied, the total resources used by the first requestor will decline. Eventually, the system will reach a steady-state where each requestor is consuming at least their fair share of resources, and the safety buffer remains in case a third requester needs resources.

As can be seen, the scheme contemplated by the invention allows for flexibility in granting resources to a requestor, while maintaining the ability to satisfy additional requesters. The scheme may thereby increase the throughput of the network, decrease number of packets dropped, and otherwise facilitate the operation of a computing device with limited resources. Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
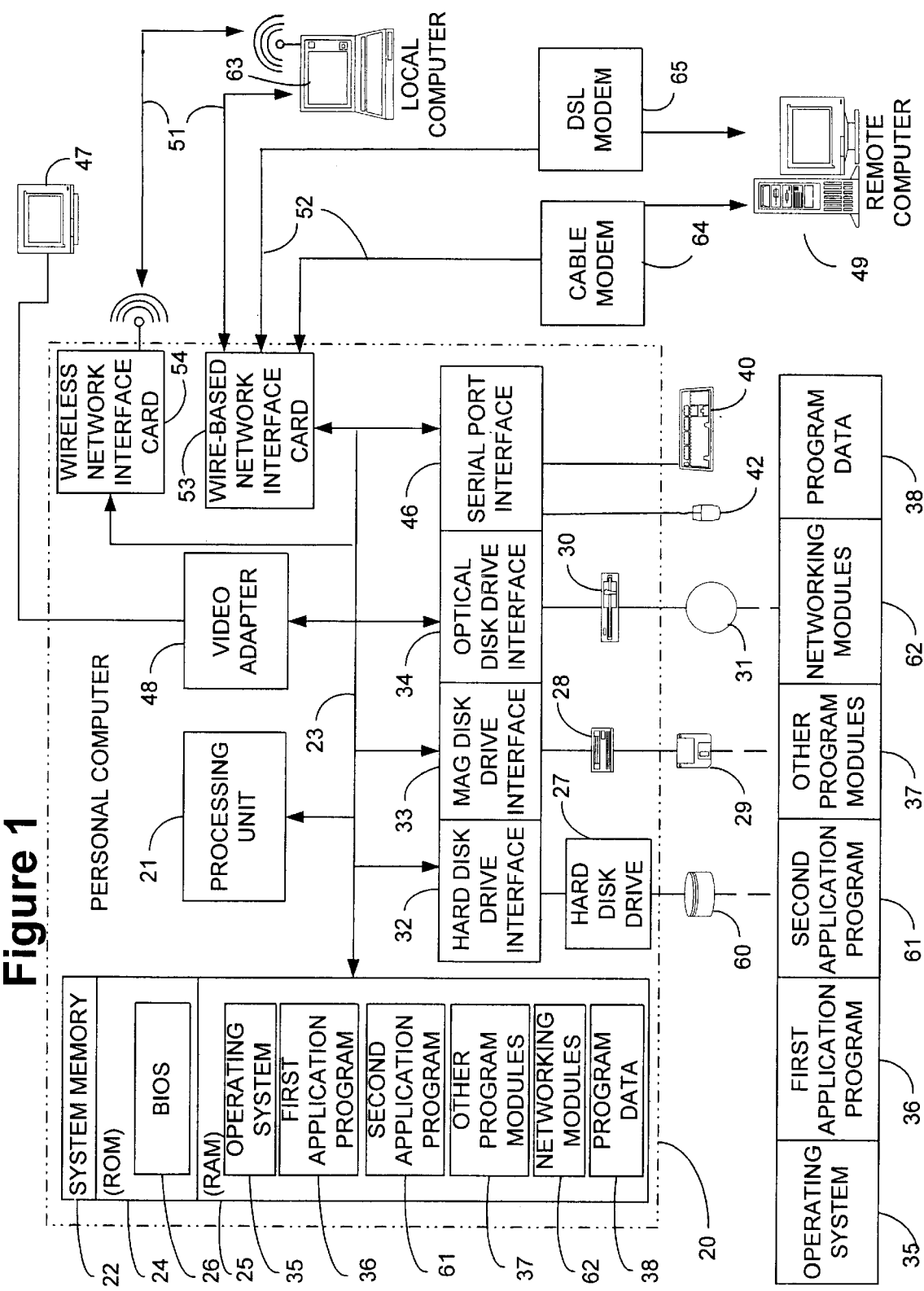
FIG. 1 is a block diagram generally illustrating an exemplary computing device system on which the present invention resides.

Turning to the drawings, wherein like reference numerals refer to like elements, the invention is described hereinafter in the context of a computing environment. As will be described in detail below and with reference to the attached drawings, the invention is a dynamic resource allocation scheme which allows for the efficient use of resources between multiple consumers. The scheme is defined by two rules: that a request will be granted while there are resources available and the requestor has not exceeded its fair share, and that a request will be granted, regardless of whether the requester has exceeded its fair share, if the available resources exceed a pre-determined safety buffer. Although it is not required for practicing the invention, the invention is described as it can be implemented by computer-executable instructions, such as program modules, that are executed by a computing device. Generally, program modules include routines, programs, objects, components, scripts, data structures and the like that perform particular tasks or implement particular abstract data types.

The invention may be implemented in a variety of computing devices, such as: personal computers (PCs), hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices.

Although the dynamic resource allocation scheme may be incorporated into many types of computing environments as suggested above, the following detailed description of the invention is set forth in the context of an exemplary general-purpose computing device 20 as shown in FIG. 1. Before describing the invention in detail, the computing environment in which the invention operates is described in connection with FIG. 1.

Turning to FIG. 1, the computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs, such as first application program 36 and second application program 61, other program modules 37, networking modules 62, and program data 38. A user may enter commands and information into the computing device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more additional computers, such as a remote computer 49 and local computer 63. The remote computer 49 may be another computing device, such as a server, a router, a network PC, a peer device or other common network node, and typically includes many or all of the elements described above relative to the computing device 20. The local computer 63 may be another computing device, such as a portable personal computer, a pen-based portable computer, a handheld computer, a personal organizer, or other common computing device, and also typically includes many or all of the elements described above relative to the computing device 20. The logical connections depicted in FIG. 1 include a local area network (LAN) 51 and a wide area network (WAN) 52. Such networking environments are commonplace in homes, offices, enterprise-wide computer networks, intranets and the Internet.

When used in a LAN networking environment, the computing device 20 can be connected to the local network 51 through a network interface or adapter, such as a wire-based Network Interface Card (NIC) 53 or a wireless NIC 54. When used in a WAN networking environment, the computing device 20 typically includes a cable modem 64, a Digital Subscriber Line (DSL) modem 65, or other means for establishing communications over the WAN 52. The cable modem 64 or DSL modem 65, which may be internal or external, are connected to the computing device 20 through a wire-based NIC 53. In a networked environment, program modules depicted relative to the computing device 20, or portions thereof, may be stored in the remote computer 49 or the local computer 63. It will be appreciated that the network connections shown are exemplary and other means of establishing a communications link between the computers may be used.

In the description that follows, the dynamic resource allocation scheme contemplated by the invention will be described with reference to acts and symbolic representations of operations that are performed by one or more computing devices, unless indicated otherwise. As such, it will be understood that such acts and operations, which are at times referred to as being computer-executed, include the manipulation of electrical signals representing data in a structured form by the processing unit of the computing device. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In accordance with one important aspect of the invention, a resource can be granted to a requestor if one of two conditions is met. The request can be granted if either the requestor holds less than its fair share of resources, and there are still unused resources available, or the requestor holds more than its share of resources, but the amount of unused resources remaining is greater than a predetermined safety buffer.

Figure 2:
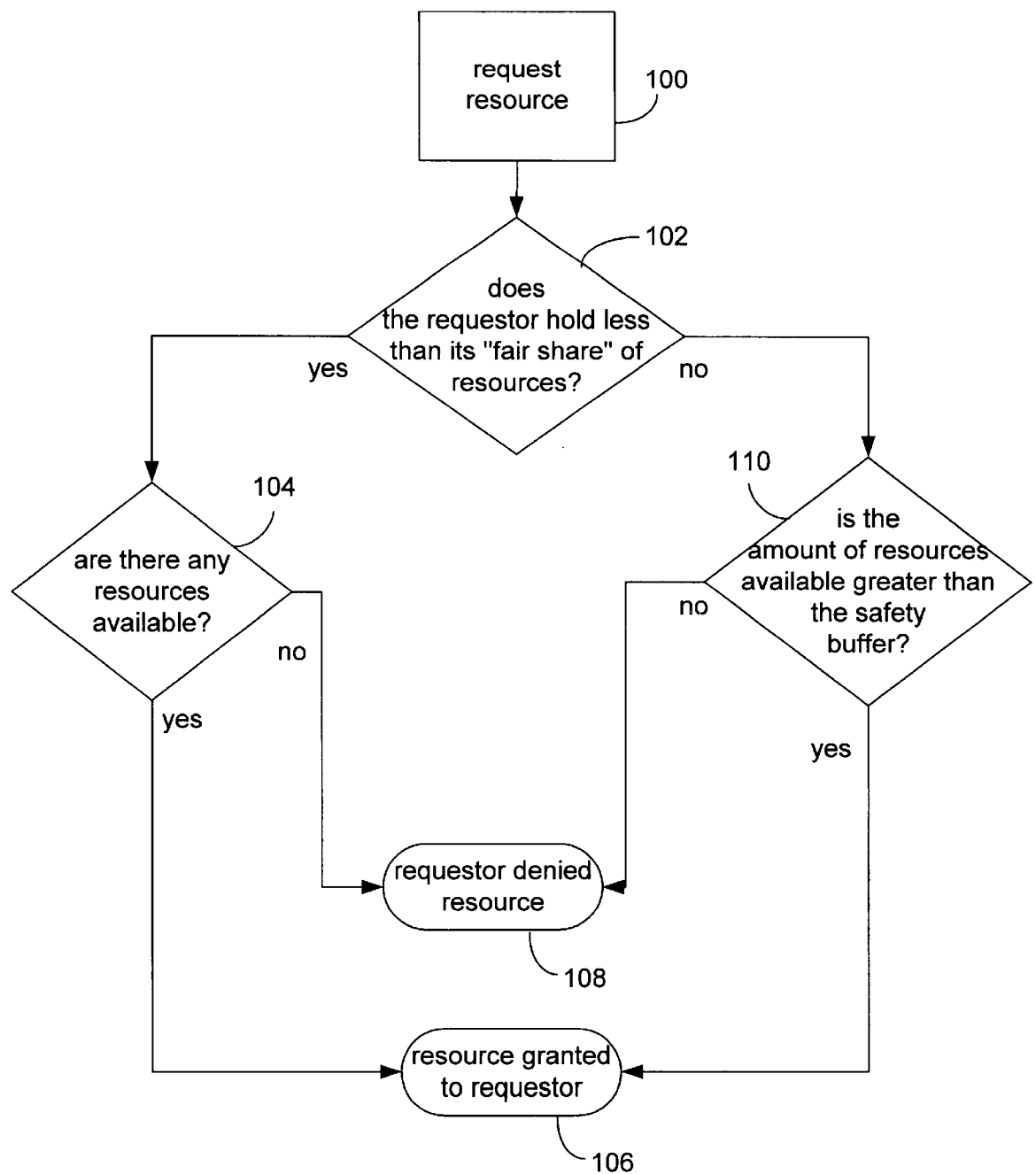
FIG. 2 is a flow chart generally illustrating the resource allocation scheme of the present invention.

Turning to FIG. 2, a flowchart illustrating the method of resource allocation contemplated by the present invention is shown. Initially, prior to a resource request being accepted at step 100, the "safety buffer" and the "fair share" of resources can be determined. A "safety buffer" is a predetermined amount of resources, or it can be a predetermined percentage of all of the available resources. As will be explained below, the safety buffer provides a cushion to accommodate increasing resource requests in an environment where one or more requestors has been granted more than their "fair share" of resources. A requestor's "fair share" of resources can be determined by mathematically dividing the total available resources to all requesters by the number of requesters. Such a mathematical division results in each requestor's fair share being an identical fraction of the total. Alternatively, a requestor's fair share can be any fraction of the total available resources, and need not be equivalent to the fair share of any other requestor.

At step 100, a resource is requested. At step 102, a comparison is made between the amount of resources currently used by the requester, and the requestor's fair share of resources. If the requester is currently consuming less than its fair share of resources, then a check is made at step 104 to determine if there are any resources remaining which can be given to the requestor. If there are free resources, the request is granted at step 106. If there are no resources remaining unused, the request is denied at step 108.

If, at step 102, it is determined that the requestor is currently consuming more than its fair share of resources, a check is made at step 110 to determine if the safety buffer has been invaded. So long as the amount of free resources remaining is greater than the predetermined safety buffer, the request is granted at step 106. If the resources remaining are less than the safety buffer, then the request is denied at step 108.

In accordance with another important aspect of the invention, resources are efficiently used over time, and each requester is generally able to consume more than its fair share of resources. As a result of the dynamic resource allocation scheme, each requestor perceives that the resources available to it are greater than they would be in a tatic partitioning scheme. This is because the present invention often allows requests for resources beyond a requestor's fair share to be granted. Thus, from the viewpoint of the requester, the resources available to it are greater than merely its fraction of the total. Because the requestors experience fewer denials than in a static memory allocation scheme, the network throughput is increased and memory is more efficiently used.

Turning to FIG. 3A, a set of free resources 203 is depicted as a bar, divided by dividers 207, 211, and 215. At an initial time of 0 (t=0), none of the resources have been granted to a requestor. However, the available resources (including those set aside as the safety buffer) have been divided into the fair shares of each of the requesters. For the purposes of illustration only, it is assumed that the system contains three requestors. The fair share of each requestor can be in this embodiment, therefore, one-third of the total available resources. The invention can operate in a like manner for systems with more or less than three requestors, and can provide similar efficiencies.

The fair share of a first requestor is indicated by segment 205 and extends up to divider 207. The fair share of a second requestor is indicated by segment 209 and is bounded by divider 207 and 211. The fair share of a third requester is indicated by segment 213 and extends beyond divider 211 to the limit of the resources. The safety buffer 201 extends beyond divider 215 to the limit of the resources. As will be appreciated by those skilled in the art, the illustrations contained in FIGS. 3 and 4 are abstractions of the physical resources and are only intended to indicate quantity, rather than a particular physical resource or the physical location of a resource. For example, in one embodiment, segments 205, 209 and 213 can be segments of computing device memory 25. However, FIG. 3 is not intended to indicate that the fair share of a first requestor must necessarily be a continuous block of memory physically adjacent to the fair share of a second requester. Rather, it is only intended to indicate that the fair share of a first requestor is a particular amount of memory, regardless of its physical location. Similarly, the safety buffer 201 is not intended to be a part of the fair share of a third requestor 213, but rather an amount of resource wherever it may be physically located.

At a later time of 1 (t=1), as shown in FIG. 3A, the first requestor begins to consume some amount of resources 217. The resources can continue to be granted to the first requester until it reaches its fair share limit 207, as shown in FIG. 3A at t=1. The first requestor can continue to be granted resources up to the fair share limit 207 because, while it is consuming resources below this limit, and returning to FIG. 2 at step 102, the requestor does hold less than its fair share of resources, and at step 104, there are resources available, as illustrated by segment 203 in FIG. 3A at t=1.

The once the requestor has reached its fair share, it can continue to be granted resources until all resources, except for the safety buffer 201, are used. As shown in FIG. 3A, at a time of 2 (t=2), the resources granted to the first requestor 217 are all of the available resources minus the safety buffer 201. The first requestor was granted the additional resources because, as shown in FIG. 2, while the first requestor does not hold less than its fair share of resources at step 102, the amount of free resources 203 continues to be greater than the safety buffer 201. When only the safety buffer 201 remains, then the free resources 203 are exactly equal to the size of the safety buffer, and the first requestor can no longer be granted resources. In such a case, the amount of free resources 203 is not greater than the safety buffer 201, and at step 110 the decision is made to deny the request, as shown in step 108.

Figure 3B:
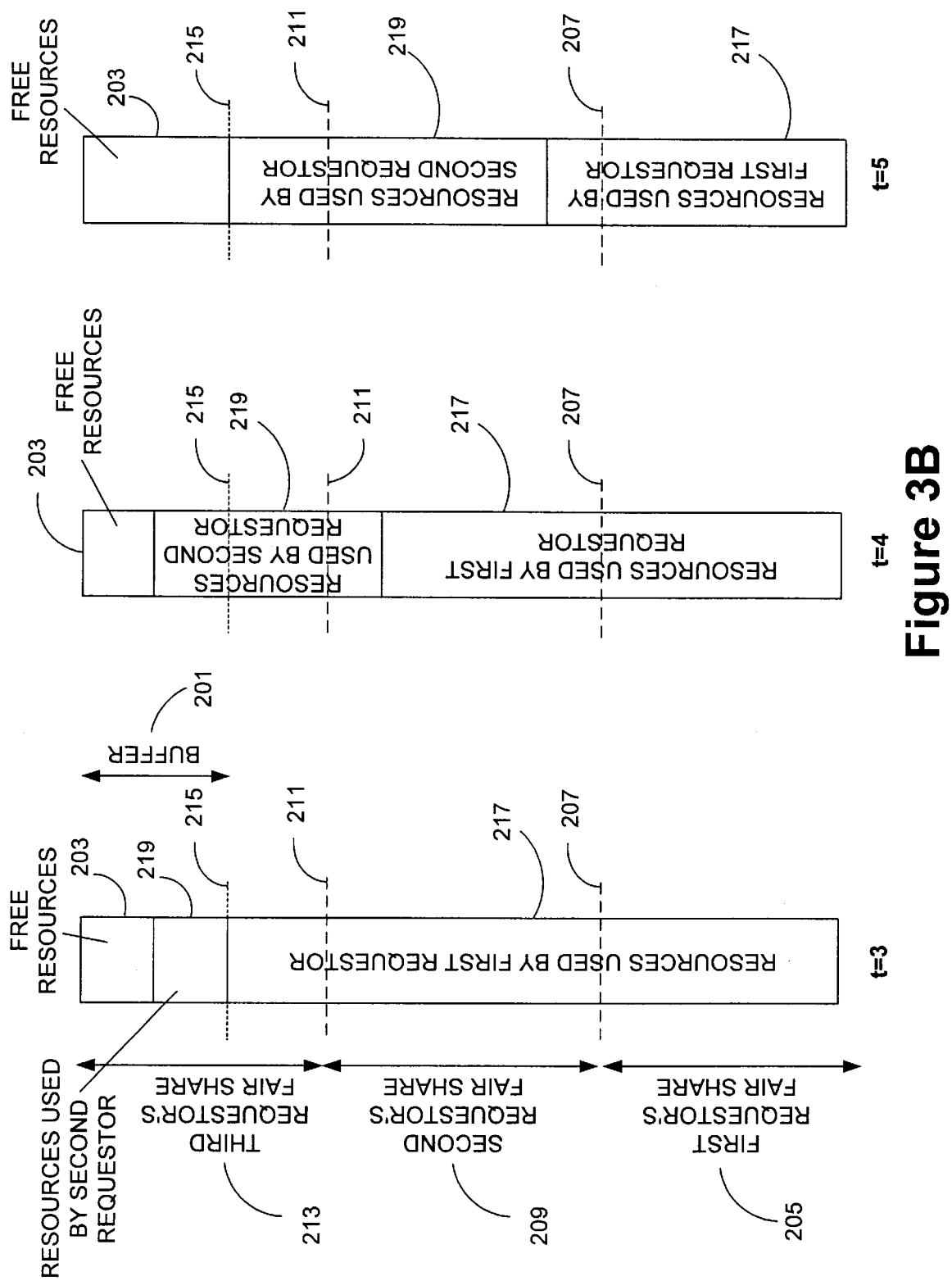
FIGS. 3A and B are block diagrams generally illustrating the allocation of resources over time according to the resource allocation scheme of the present invention.

Turning to FIG. 3B, at a later time of 3 (t=3) the second requestor requests resources. Initially, the second requestor is provided resources 219 from the buffer 201, reducing the number of free resources 203. Turning back to FIG. 2, the second requestor does hold less than its fair share of resources at step 102 and there are resources available (free resources 203) at step 104. Therefore, the second requestor is granted the resources 219. Concurrently, further requests from the first requestor can be denied. As can be seen from FIG. 3B at t=3, the amount of free resources 203 is less than the safety buffer 201. Thus, at step 110 in FIG. 2, the amount of free resources is not greater than the safety buffer, and the first requestor's requests are denied at step 108.

While its requests are being denied, the first requestor is still operating upon the resources given to it. When it has finished whatever task required those resources, the resources can be returned to the pool of free resources 203. Because the first requestor's requests for additional resources are being denied, and its old resources are being returned, there is a net decrease in the amount of resources being used by the first requester 217. As shown in FIG. 3B, at a time of 4 (t=4), the resources used by the first requestor 217 has decreased. However, the resources used by the second requestor 219 has increased. The second requestor is still being granted resources because the amount of resources it has used 219 is still less than its fair share of resources 209 and free resources 203 remain. As can be seen, the resources being returned by the first requester are being granted to the second requester.

Eventually, the second requestor will also consume more than its fair share. In the situation where both the first and the second requestors are consuming more than their fair share, either one can be granted a resource as long as the free resources 203 is larger than the amount of the safety buffer 201. As can be seen in FIG. 3B at a time of 5 (t=5), the amount of resources used by both the first requester 217 and the second requestor 219 exceed the amounts of the first requestor's fair share 205 and the second requestor's fair share 209, respectively. However, the amount of free resources 203 is equivalent to the safety buffer 201. Returning to FIG. 2, neither the first nor the second requestor will be granted their requests if they exceed their fair share of resources at step 102 and the amount of free resources is not greater than the safety buffer at step 110. Therefore, the first and second requesters will not receive any resources once the free resources 203 have been consumed to the limit of safety buffer 201. Furthermore, assuming they request and process resources at very similar rates, a steady-state situation can be achieved where both the first and second requestors will obtain approximately half of the resources remaining after the amount of the safety buffer has been subtracted out.

It is interesting to note that in the situation where all three requesters are consuming the maximum amount of resources allotted to them, the steady-state situation can leave no free resources and the safety buffer will be completely used up. As can be seen from FIG. 2, if the requestor is using less than its fair share at step 102 and there are any available resources at step 104, then resources will be granted to the requester, regardless whether the free resources are less than the safety buffer. Since the fair share of the requestors is determined by dividing all of the resources by the number of requesters, if every requestor is consuming their fair share, all of the resources will be consumed. This situation is entirely desirable, as there is no reason to reserve a safety buffer once every requester has asked for the maximum amount of resources, because there is no requestor left for which the safety buffer needs to be saved.

Figure 4A:
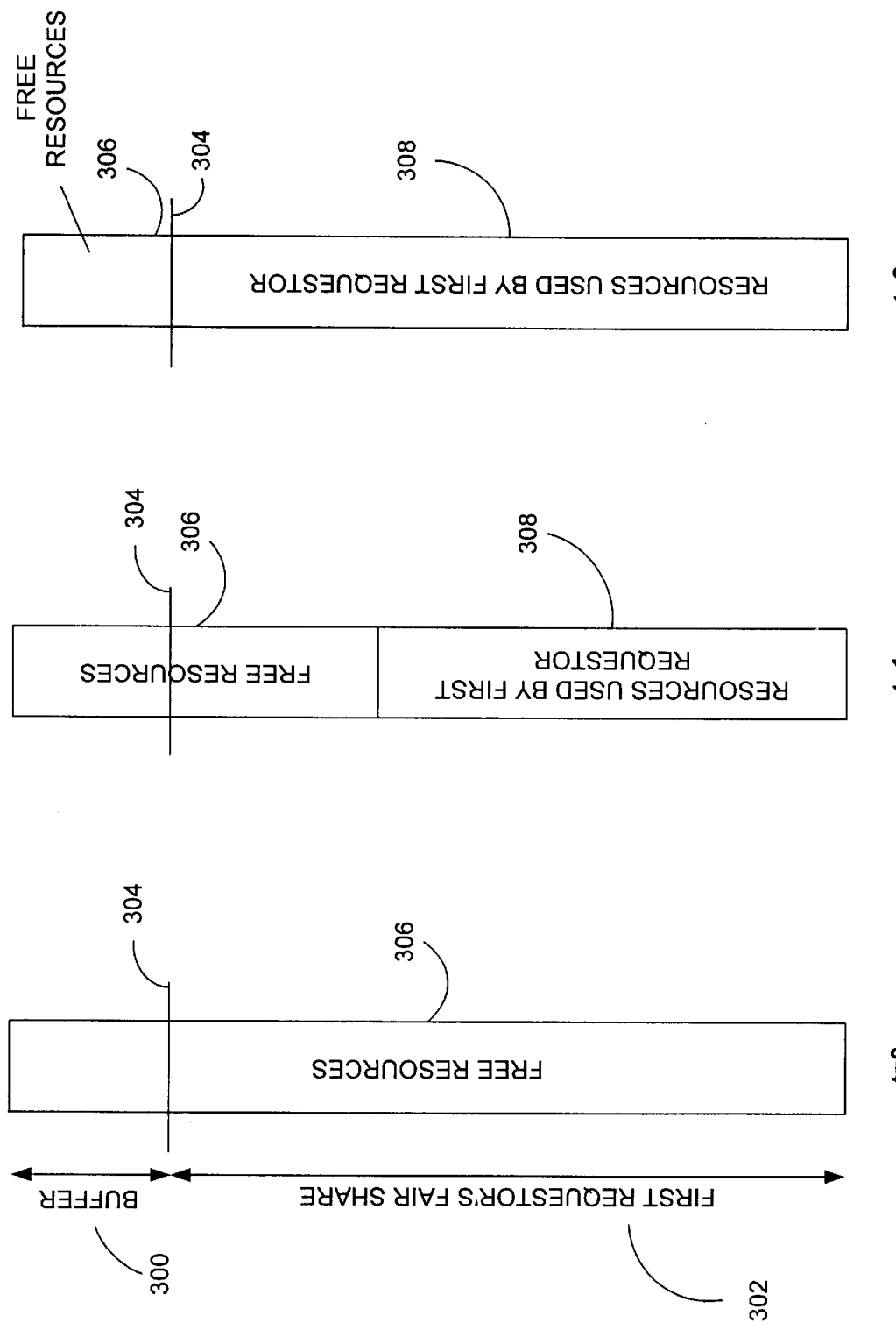
FIGS. 4A and B are block diagrams generally illustrating the allocation of resources over time according to the resource allocation scheme of the present invention.

In accordance with yet another important aspect of the invention, the number of requestors does not need to be known in advance for the dynamic memory allocation scheme of the present invention to work. Turning to FIG. 4A, a set of available resources is again depicted as a bar, divided by divider 304 into resources set aside for the safety buffer 300 and free resources 306. While the number of requestors is not known, it can be assumed that initially, at least one requestor will request a resource. Thus, at an initial time of 0 (t=0), the fair share of a first requestor is equivalent to all of the unused resources 306, as indicated by segment 302 extending until the divider 304. In this embodiment, the fair share of each requestor is determined by dividing the available resources minus the safety buffer by the known number of requestors. As will be shown, this differs from the previous implementation by always leaving a safety buffer unused, even when all of the known requesters are asking for the maximum amount of resources. Another difference between the embodiment where the number of requesters is known beforehand and the current embodiment is that in the current embodiment the fair share of a requestor can be determined anew whenever a previously unknown requestor makes a request. Thus, while in the previous embodiment, the fair share of a requestor was a constant; it is variable in the current embodiment.

Returning to FIG. 4A, at a later time of 1, the first requestor begins to consume some amount of resources, indicated by segment 308. Resources will continue to be granted to the first requestor because, as can be seen with reference to FIG. 2, at step 102, the first requester has not yet used all of its fair share 302, and, at step 104, there are free resources 306 remaining. The first requestor can continue being granted resources in this manner until it has consumed all of its fair share, leaving free resources 306 only in the amount of the safety buffer 300.

Such a situation is illustrated in FIG. 4A at a later time of 2 (t=2). The first requestor has used resources 308 in an amount equivalent to its fair share 302, leaving free resources 306 only in the amount of the safety buffer 300. The safety buffer, as was explained above, can always exist in a steady-state environment where the total number of requestors is unknown. Therefore, if another previously unknown requestor makes a request, the safety buffer can provide the necessary free resources to accommodate the request.

Figure 4B:
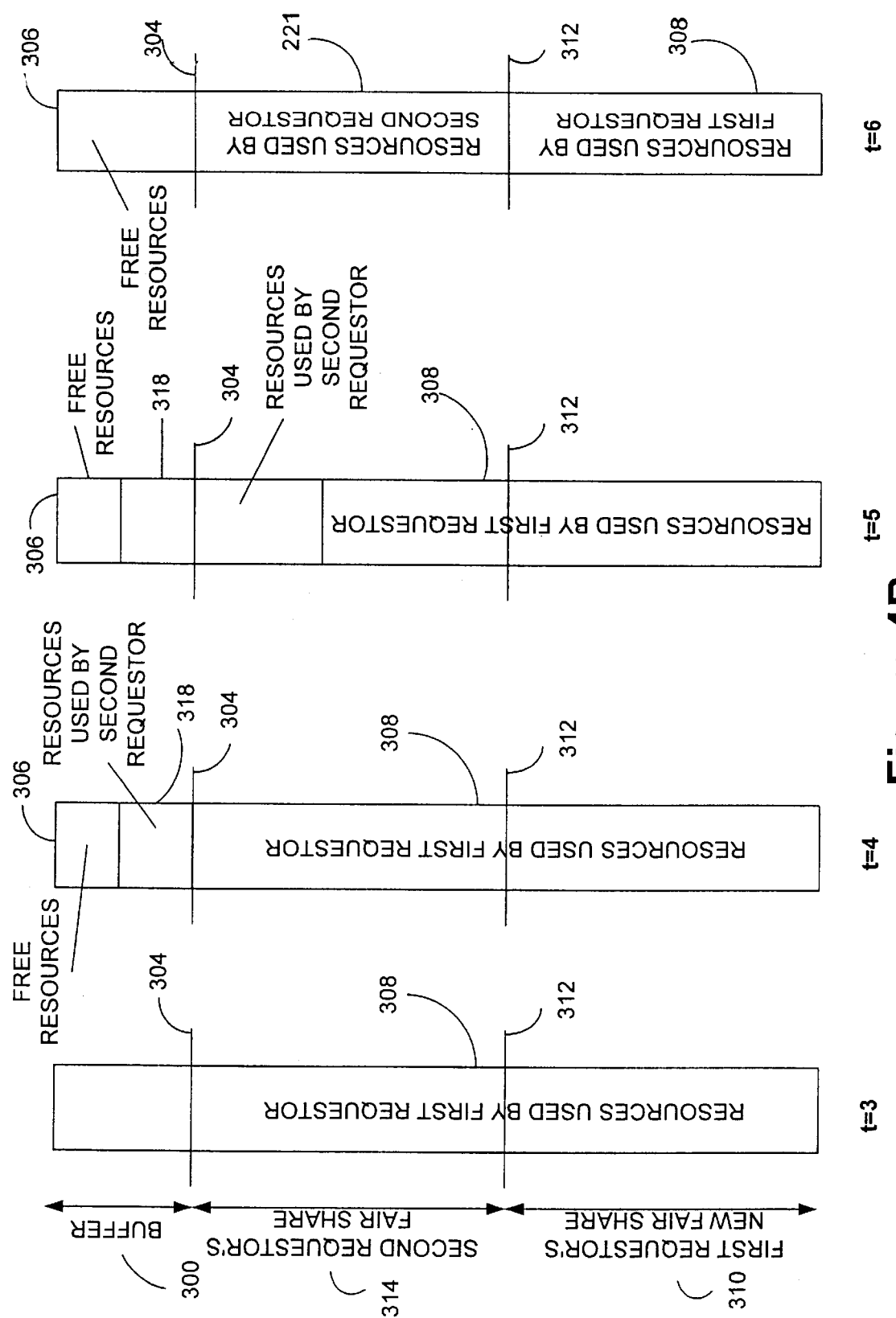

Turning to FIG. 4B, the situation of a previously unknown second requester is illustrated. At a time of 3 (t=3), with the first requestor consuming resources 308, a second, previously unknown requestor, makes a request. The resources, minus the safety buffer 300 are partitioned again into the first requestor's new fair share 310, and the second requestor's fair share 314. Upon the re-partitioning, the first requestor's consumed resources 308 now exceed the first requestor's new fair share 310.

At a time of 4 (t=4), some resources 318 have been granted to the second requestor from the safety buffer 300. Because there are now fewer free resources 306 than the safety buffer 300, further requests by the first requestor will be denied. As shown in FIG. 2, if the requester is using more than their fair share at step 102 and the amount of free resources is less than the safety buffer at step 110, the request for resources will be denied at step 108. As above, when the first requestor is returning resources it is no longer using, and it is no longer being granted new resources, the net effect is that the amount of resources used by the first requestor is decreasing. Concurrently, the resources being returned by the first requester are being granted to the second requestor because, as can be seen in FIG. 4B at t=4, the resources currently being used by the second requestor 318 are less than the second requestor's fair share 314, and free resources 306 remain. Thus, per the flowchart of FIG. 2, at step 102, the requestor is consuming less than their fair share, and at step 104, there are available resources, hence the request is granted at step 106.

If the second requestor continues to need increasing amounts of resources, it will continue to receive those resources from the resources being given up by the first requestor. As shown in FIG. 4B at a time of 5 (t=5), the resources used by the second requestor 318 has increased since t=4 and the resources used by the first requestor 308 has decreased. Such a transfer of resources will continue, assuming both the first and second requesters continue needing additional resources, until a steady-state is reached.

FIG. 4B at a time of 6 (t=6) illustrates the steady-state situation: both the first and second requestors are using an amount of resources equivalent to their fair shares. Neither can exceed their fair share because, assuming the other still holds a fair share, the excess would decrease the free resources 306 beyond the amount of the safety buffer 300. As can be seen from the flowchart in FIG. 2, if a requestor holds their fair share (or greater) at step 102, and the free resources are less than the safety buffer at step 110, the request for additional resources is denied at step 108. The steady-state where all known requesters are using their maximum share of resources still maintains an amount of free resources 306 equal to the safety buffer 300 for the embodiment where all of the requesters are not known beforehand. Thus, in FIG. 3B at t=5, all of the resources are used as there are no further requesters from whom a safety buffer needs to be maintained. In the present embodiment, as shown in FIG. 4B at t=6, a safety buffer is maintained because there still can exist unknown requestors which can ask for resources and should not be denied immediately.

It is important to note that the fair share of one requester need not be equivalent to the fair shares of all of the other requesters. The present invention is equally applicable to fair shares of varying sizes. For example, the fair share of a requester who may require more resources more often can be larger than the fair share of a requester who rarely needs resources. However, as can be seen from descriptions above, the selection of the size of the fair share will only affect the number of resources granted to a requestor in an environment where the free resources are less than the safety buffer. If the free resources are greater than the safety buffer, then the requestor will receive resources regardless of the size of their fair share, until the amount of free resources has been reduced to the size of the safety buffer. Nevertheless, in an environment where the free resources are often smaller than the safety buffer, setting the fair share of a requestor to be larger than that of the other requesters will guarantee that the selected requestor receives more resources.

In keeping with the invention, the dynamic memory allocation scheme is most effective in an environment where there are many individual resources, a requester does not use a particular resource for a long period of time, and a requestor can return a resource once it has finished its task with that resource. One preferred embodiment of the present invention is the allocation of memory in the form of Network Interface Card (NIC) buffers to store packets for transmission across a network. As is known by those skilled in the art, a NIC provides the hardware for transforming data stored on a computer into physical signals, such as voltage or light intensity, to be applied to a physical medium, such as a wire or a fiber-optic cable. A corresponding NIC on another computer monitors the physical medium and transforms the physical signals it detects back into data on the second computer. In this manner data is transmitted across a network. However, a NIC cannot simultaneously transmit all of the data being sent by the communicating software. Instead, data is sent a few bits at a time, depending on the condition of the physical medium carrying the signals. In order for the communicating software to continue to operate efficiently, the management of the sending of the data through a NIC is generally assigned to a NIC driver. One function of a NIC driver is to accept data for transmission across a network, store it into a buffer, read the data from the buffer a few bits at a time, and deliver those bits to the NIC for transmission. Once a single packet of data has been sent, it is cleared from the buffer, and transmission is begun on another packet.

Turning again to FIG. 1, computing device 20 contains system memory 22, including RAM 25, and two types of NICs, a wireless NIC 54 and a wire-based NIC 53. Operating within the RAM 25 are networking modules 62, which control the flow of data to either the LAN 51 or the WAN 52. The computing device 20 also has operating within the RAM 25 a first application program 36 and a second application program 61. Both application programs may simultaneously be using networking modules 62 to communicate with a network. For example, the first application program 36 can be a data synchronization program communicating with the local computer 63 through the wireless NIC 54; and the second application program 61 can be a World Wide Web browser communicating with a World Wide Web server, such as remote computer 49, through the wire-based NIC 53.

Figure 5:
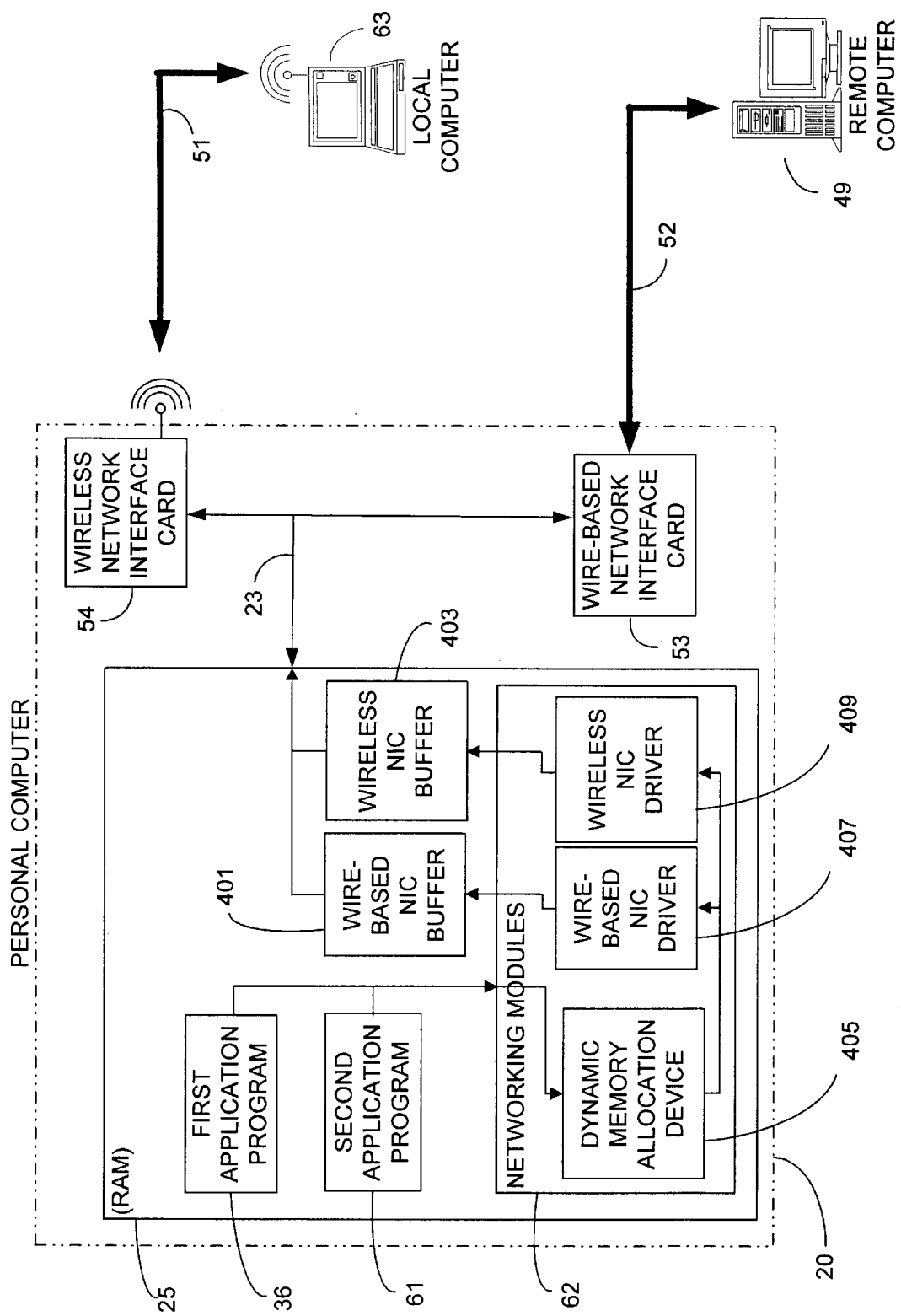
FIG. 5 is a block diagram generally illustrating a simplified computing device on which the present invention resides.

As explained in detail above, each NIC requires a buffer to temporarily store packets of information destined for transmission across the network. FIG. 5 illustrates the computing device 20 from FIG. 1 in a more simplified fashion. Each NIC is shown with a corresponding buffer in RAM 25. The wireless NIC 54 has an associated wireless NIC buffer 403 in RAM 25, and the wire-based NIC 53 has an associated wire-based NIC buffer 401 in RAM 25. While buffers 401 and 403 are drawn as independent, undivided segments, it will be clear to those with skill in the art that the physical memory units which comprise buffers 401 and 403 can be interspersed throughout the physical RAM structure, and are not required to be contiguous. Each NIC also has a driver as part of the networking modules 62. The wireless NIC 54 has an associated wireless NIC driver 409 in networking modules 62, and the wire-based NIC 53 has an associated wire-based NIC driver 407 in networking modules 62. Also in the networking modules 62 is a dynamic memory allocation device 405 which implements the dynamic memory allocation scheme of the present invention. As a whole, networking modules 62 reside in RAM 25, as shown in both FIGS. 1 and 5.

In the example above, where a first application program 36 is performing a data synchronization operation with the local computer 63 and the second application program 61 is browsing the web server 49; the first application program can give to the networking modules 62 data to be sent to the local computer 63 and the second application program 61 can give to the networking modules 62 data to be sent to the remote computer 49. As would be known by those skilled in the art, the networking modules 62 can perform additional operations on the data, such as appropriately packaging the data for transmission on the various mediums. The data is then provided to the wireless NIC driver 409 for transmission across the wireless LAN 51 by the wireless NIC 54 or to the wire-based NIC driver 407 for transmission across the Internet 52 by the wire-based NIC 53. The NIC drivers 407 and 409 can request memory space for the packets from the dynamic memory allocation device 405. As will be explained below in connection with FIGS. 6A and B, the dynamic memory allocation device can determine whether to grant sufficient memory to the NIC drivers 407 and 409 to store the packets for transmission.

Should their memory requests be granted, NIC drivers 407 and 409 can store the packets into the NIC buffers 401 and 403 as provided by the dynamic memory allocation device 405. The NICs 53 and 54 will read the packets from the buffers 401 and 403 and transmit them across networks 51 and 52.

As can be seen from FIG. 5, the NIC buffers 401 and 403 reside in RAM 25, decreasing the available RAM for software such as application programs 61 and 36. Generally, it is important to the end user of the computing device 20 that application programs 61 and 36 have available to them the RAM they need to operate properly. Thus, to maximize the RAM available to applications and higher level system processes, it is desirable that the networking modules 62 consume a little RAM as possible. The dynamic resource allocation scheme of the present invention allows the RAM consumption of the networking modules to remain small while insuring a fair and efficient distribution of RAM to the buffers.

Turning to FIG. 6, the memory to be allocated to buffers 401 and 403 is illustrated as free memory 502 in the amount of one megabyte (MB). The 1 MB is divided by divider 506, delineating the wireless NIC's fair share 504 and the wire-based NIC's fair share 508, each of which is 512 kilobytes (KB). Approximately 200 KB of the 1 MB are set aside as safety buffer 500, delineated by divider 510. At an initial time of 0 (t=0), all 1 MB of the memory to be allocated to buffers 401 and 403 is free memory 502. As is known to those of skill in the art, buffers 401 and 403 may have some minimal transient memory usage when NICs 53 and 54 are transmitting on uncongested networks, since each packet sent through either the wire-based NIC 53 or the wireless NIC 54 is placed in buffers 401 and 403 prior to being sent and is cleared as soon as it is sent. The memory usage is minimal and transient because, in an uncongested network, the packets are cleared from the buffers as quickly as they are being added. Therefore, the buffers only have, on average, a single packet stored at any one time, and a single packet can be an inconsequential amount of memory usage.

Figure 6A:
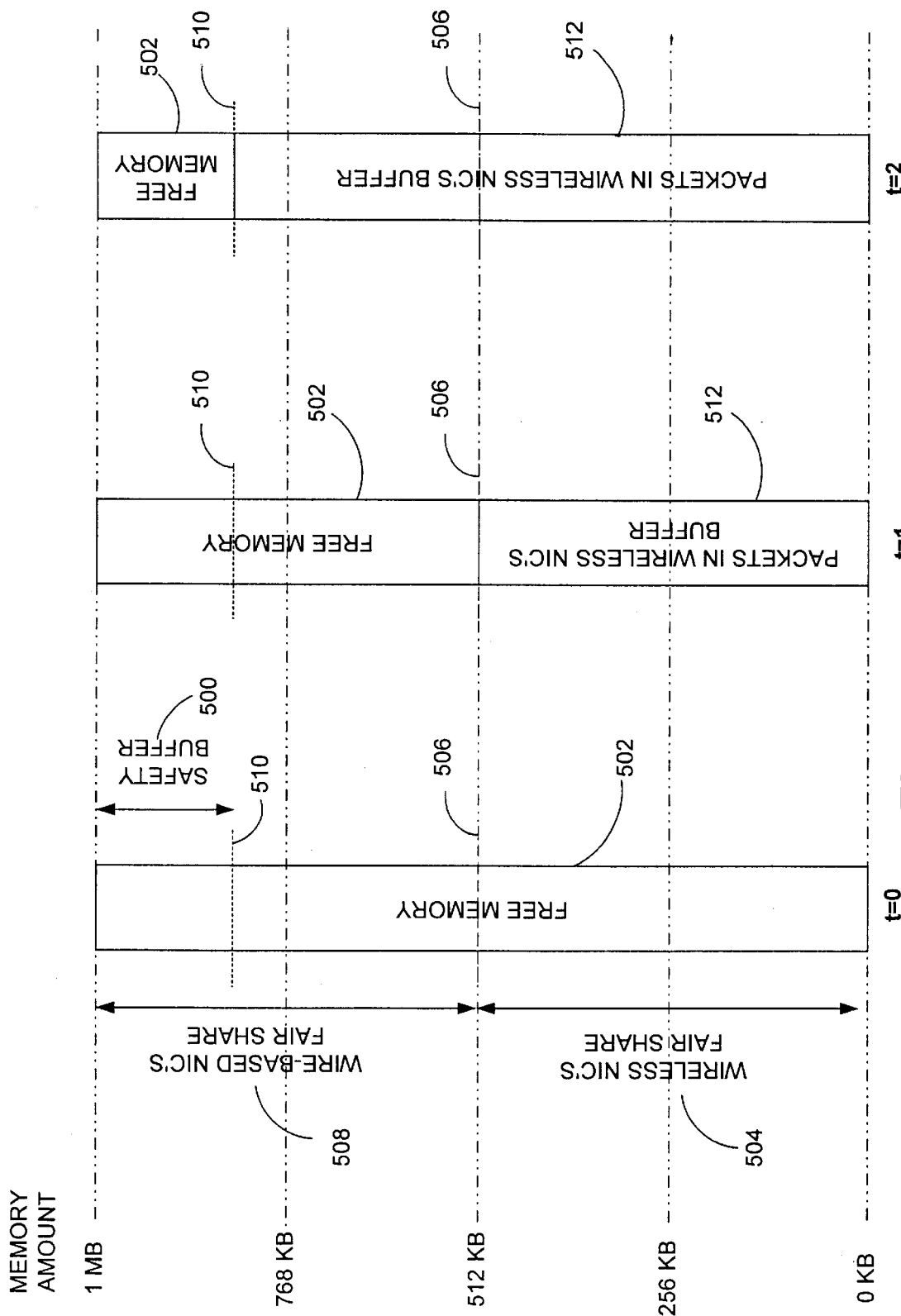
FIGS. 6A and B are block diagrams generally illustrating the allocation of memory to network interface card buffers over time according to the resource allocation scheme of the present invention.

For purposes of illustrating a preferred embodiment of the present invention, assume that at a time of 1 (t=1) after the initial time, the wireless LAN 51 experiences a slowdown due to a change in environmental circumstances. For example, the rate of reliable data transmission across the wireless LAN 51 might drop from 11 megabits per second to 4 megabits per second because the local computer 63 was moved further away. As a result, the wireless NIC 54 will not be able to transmit packets as quickly as they are being delivered by the first application program 36. The delivered packets will begin to queue in the wireless NIC's buffer 403, using up available memory. As shown in FIG. 6A at t=1, the queued packets 512 can continue to be queued until they have consumed 512 KB of memory. As explained above in connection with FIG. 2, memory will be granted to the wireless NIC's driver 409 and added to the wireless NIC's buffer 403 because it has not yet used up all of its fair share at step 102 and at step 104, there is sill available memory in the form of free memory 502.

Once the fair share 504 of the 1 MB belonging to the wireless NIC has been consumed, however, further memory will only be granted if the amount of free memory 502 is at least 200 KB in size, equal to the safety buffer 500. As shown above with FIG. 2, once the size of the wireless NIC's buffer reaches its fair share at step 102, further memory can be granted only if the amount of free memory is greater than the safety buffer at step 110. As can be seen in FIG. 6A at t=1, free memory 502 does indeed exceed the 200 KB set aside for the safety buffer 500, allowing additional memory to be granted to the wireless NIC's driver 409.

Additional memory will continue to be granted to the wireless NIC's driver 409 until the amount of free memory 502 remaining is the 200 KB safety buffer 500. Such a situation is illustrated in FIG. 6A at a time of 2 (t=2). It is important to note that at t=2, the number of packets 512 queued in the wireless NIC's buffer 403 is nearly double its fair share. Each of these packets has not been discarded, but is awaiting transmission. If the rate of reliable data transmission across the wireless LAN 51 increases again, for example returning to 11 megabits per second because the local computer 63 was returned to its original position, the packets queued 512 can begin to be cleared out of the wireless NIC's buffer 403, as the wireless NIC 54 can be sending the packets from its buffer faster than the first application program 36 will be delivering them. Should the rate of transmission increase at t=2illustrated in FIG. 6A, no packets will have been dropped due to the wireless NIC's buffer 403 exceeding its memory restrictions. The present invention, therefore, can accommodate a slowdown in the wireless LAN 51 of almost double the duration that could have been handled if the wireless NIC buffer was limited in size to its fair share. Yet because the safety buffer was maintained, the present invention allows for a fair distribution of memory to all of the buffers, both for minimal, transient requests, and for more substantive slowdowns, as will be shown below.

Within a relatively short amount of time after the transmission across the wireless LAN 51 improves, the wireless NIC 54 can send all of the packets queued in its buffer 403, returning to the situation illustrated in FIG. 6A at t=0. If the reliable rate of transmission across the WAN 52 subsequently decreases, for example, due to an increasing number of users simultaneously attempting to access the remote computer 49, then the wire-based NIC's driver 407 can begin to queue the packets in the wire-based NIC's buffer 401 in an identical manner to that described above. Similarly, if there are no slowdowns on the wireless LAN 51, the wire-based NIC's driver 407 can also store in the wire-based NIC's buffer 401 packets beyond its fair share 508. The present invention, therefore, allows both NICs 53 and 54 the ability to store more than their fair share should they experience network slowdowns at different times. In fact, if the wireless NIC 54 was able to clear out its queued packets prior to the slowdown in the WAN 54, both networks would have been able to accommodate almost double the delay they could under a static allocation scheme and not discard any packets due to buffer overflows.

Figure 6B:
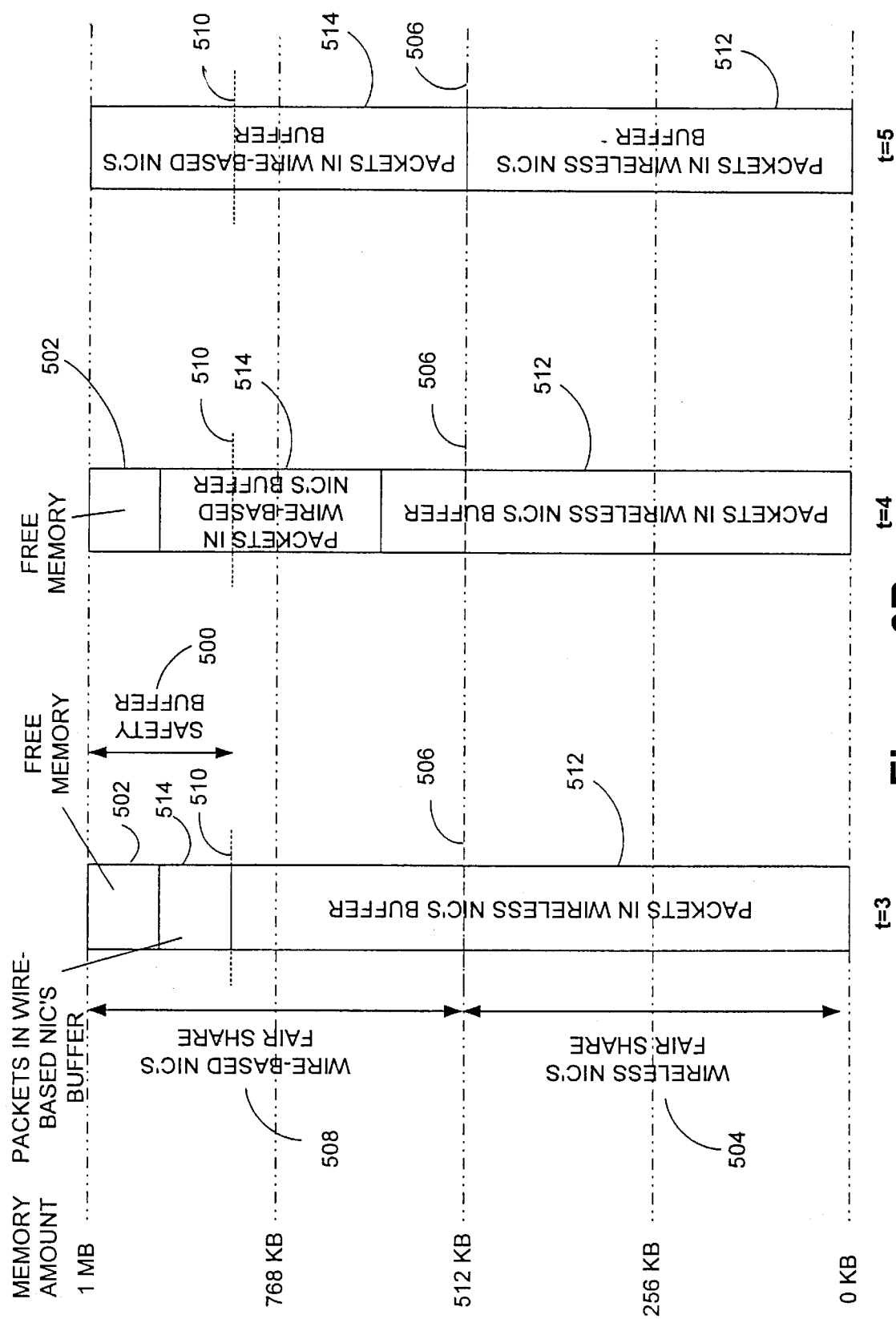

Should the reliable rate of transmission across the WAN 52 decrease prior to the restoration of increased transmission rates on the wireless LAN 51, the wire-based NIC's driver 407 can be granted the 200 KB of free memory 502 remaining as the safety buffer 500. Turning to FIG. 6B, at a time of 3 (t=3) the queued packets 514 of the wire-based NIC are shown using 100 KB, leaving only 100 KB of free memory 502 remaining. As explained above, because the packets stored in the wire-based NIC's buffer 514 occupy less memory than the wire-based NIC's fair share 508 at step 102 in FIG. 2, step 104 dictates that memory be granted to the wire-based NIC's driver 407 and added to the wire-based NIC's buffer 401 if there is any free memory 502 remaining. The slowdown in the wireless LAN 51, however, may not have improved, and the wireless NIC's driver 409 may still need to queue packets. However, as was explained in more detail above, because the packets 512 stored in the wireless NIC's buffer occupy more memory than the wireless NIC's fair share 504 at step 102 and since the free memory 502 is now less than the safety buffer 500, step 110 can deny any further requests for memory from the wireless NIC's driver 409. Conversely, the wireless NIC 54 continues to send packets through the wireless LAN 51 at two megabits per second, and each packet that is successfully sent is removed from the wireless NIC's buffer 403. No additional packets are being added to the queue of the wireless NIC 54 due to the denial of additional memory, and already queued packets are slowly being removed. As a result the number of packets in the wireless NIC's buffer 403 decreases, reducing the memory consumed by NIC 54.

Turning to FIG. 6B at a time of 4 (t=4), the packets 512 queued in the wireless NIC's buffer 403 have decreased in size to approximately 600 KB from 800 KB at t=3. The decrease of 200 KB by the wireless NIC's buffer 403 was offset by an increase of 200 KB in the memory consumed by the wire-based NIC's buffer 401. Thus, as shown in FIG. 6B at t=4, the free memory 502 continues to be approximately 100 KB in size, below the amount set for the safety buffer 500. Because the packets 514 queued for the wire-based NIC 53 are still only approximately 300 KB, the wire-based NIC's buffer 401 has not yet consumed its fair share of memory and additional memory will be granted to the wire-based NIC's driver 407, if there is any free memory 502 remaining. Similarly, because the free memory 502 remains less than the safety buffer 500, additional requests from the wireless NIC's driver 409 will continue to be denied, resulting in an overall decrease in the amount of packets 512 queued in the wireless NIC's buffer 403 as the old queued packets continue to be sent at a reduced rate and removed from the buffer.

Ultimately, no new memory will be granted to the wireless NIC's driver 409 until the packets queued 512 consume less memory than the wireless NIC's fair share 504; and new memory will continue to be granted to the wire-based NIC's driver 407 until the packets queued 514 consume at least as much memory as the wire-based NIC's fair share 508. Assuming both NIC drivers continue to request memory, a steady-state will be reached as illustrated in FIG. 6B at a time of 5 (t=5). Since all of the NIC drivers are requesting memory, there is no free memory and the safety buffer 500 is completely used. Furthermore, each NIC's buffer has expanded to their fair share of the resources. Neither NIC driver will be able to receive more memory until there is at least 200 KB in free memory. Returning to FIG. 2, once a NIC has received their fair share at step 102, they can be assigned more memory if the amount of free memory is at least as large as the safety buffer at step 110. Therefore, as can be seen from FIG. 6B at t=5, if all of the NICs are experiencing a network slowdown, then each card will only be able to buffer its fair share of packets. However, if only one network is experiencing a slowdown, the present invention will allow more packets to be buffered, and increase the chances that the network will speed up before any packets have to be dropped and network service disrupted.

The dynamic resource allocation scheme of the present invention is equally applicable to computing environments other than network card buffer storage. For example, printer drivers require buffer storage for documents being spooled to a printer. In an analogous manner to that described above, two printer drivers can be granted memory storage for print jobs, and should one printer experience a slowdown in printing or an increase in the number of print jobs being sent to it, its buffer can expand beyond its fair share. Similarly, the present invention can also be applied to discrete operations performed by higher level software, such as calculations by a spreadsheet program, or searches by a database program. The dynamic resource allocation scheme increases the available resources to a requester without unfairly limiting the access to resources by other requestors, facilitating fewer denials to requesters and more resources for other processes.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of allocating a resource from a set of resources to a requestor comprising the steps of:
    receiving a request for the resource from the requestor;
    checking a resource consumption of the requestor;
    checking a resource availability;
    comparing the resource consumption of the requestor with a fair share of resources for the requestor;
    granting the request for the resource if the resource availability is not zero and the resource consumption of the requestor is less than the fair share of resources for the requester;
    and granting the request for the resource if the resource availability is greater than a safety buffer and the resource consumption of the requestor is greater than the fair share of resources for the requester.

2. The method of claim 1 wherein the fair share of resources for the requestor is determined by dividing the set of resources among a group of requesters.

3. The method of claim 2 wherein the dividing the set of resources among the group of requesters comprises dividing the set of resources equally among all of the requesters in the group of requestors.

4. The method of claim 2 wherein the dividing the set of resources among the group of requesters comprises the steps of:
    determining a useable set of resources by subtracting the safety buffer from the set of resources; and
    dividing the useable set of resources by a known number of requestors from the group.

5. The method of claim 1 wherein the safety buffer is determined by reference to a fraction of all of the resources.

6. The method of claim 1 wherein the safety buffer is determined by reference to a specific amount of resources.

7. The method of claim 1 wherein the resource is a unit of memory.

8. The method of claim 1 wherein the requestor is a networking module.

9. The method of claim 8 wherein the networking module is a wireless network interface.

10. A computer-readable medium having computer-executable instructions for allocating a resource from a set of resources to a requestor, the computer-executable instructions performing steps comprising:
    receiving a request for the resource from the requester;
    checking a resource consumption of the requestor;
    checking a resource availability;
    comparing the resource consumption of the requester with a fair share of resources for the requester;
    granting the request for the resource if the resource availability is not zero and the resource consumption of the requester is less than the fair share of resources for the requestor;
    and granting the request for the resource if the resource availability is greater than a safety buffer and the resource consumption of the requester is greater than the fair share of resources for the requester.

11. The computer-readable medium of claim 10 wherein the fair share of resources for the requestor is determined by dividing the set of resources among a group of requesters.

12. The computer-readable medium of claim 11 wherein the dividing the set of resources among the group of requesters comprises dividing the set of resources equally among all of the requestors in the group of requesters.

13. The computer-readable medium of claim 11 wherein the dividing the set of resources among the group of requesters comprises the steps of:
    determining a useable set of resources by subtracting the safety buffer from the set of resources; and
    dividing the useable set of resources by a known number of requestors from the group.

14. The computer-readable medium of claim 10 wherein the safety buffer is determined by reference to a fraction of all of the resources.

15. The computer-readable medium of claim 10 wherein the safety buffer is determined by reference to a specific amount of resources.

16. The computer-readable medium of claim 10 wherein the resource is a unit of memory.

17. The computer-readable medium of claim 10 wherein the requestor is a networking module.

18. The computer-readable medium of claim 17 wherein the networking module is a wireless network interface.

19. A computing device comprising:
    a component requesting a resource;
    a resource management module; and
    a set of resources;
    wherein the resource management module will grant the resource to the component if there is an unused resource in the set of resources and the component is using less than a fair share of resources for the component; and
    wherein the resource management module will grant the resource to the component if a set of unused resources in the set of resources is greater than a safety buffer and the component is using more than the fair share of resources for the component.

20. The computing device of claim 19 wherein the fair share of resources for the component is determined by dividing the set of resources among a group of components.

21. The computing device of claim 20 wherein the dividing the set of resources among the group of components comprises dividing the set of resources equally among all of the components in the group of components.

22. The computing device of claim 20 wherein the dividing the set of resources among the group of components comprises the steps of:

determining a useable set of resources by subtracting the safety buffer from the set of resources; and dividing the useable set of resources by a known number of components from the group.

23. The computing device of claim 19 wherein the safety buffer is determined by reference to a fraction of the set of resources.

24. The computing device of claim 19 wherein the safety buffer is determined by reference to a specific amount of resources.

25. The computing device of claim 19 wherein the resource is a unit of memory.

26. The computing device of claim 19 wherein the component is a network interface card driver and the resource management module is a dynamic memory allocation device.

27. The computing device of claim 26 wherein the network interface card driver is a wireless network interface card driver.

28. A method of ensuring a fair allocation of a set of resources by reserving a safety buffer of resources, the method comprising the steps of:

maintaining the safety buffer of resources; and granting a request for a resource if either: (1) a requestor is currently assigned less than a fair share of resources for the requestor and the safety buffer of resources is not empty or (2) a set of available resources is larger than the safety buffer of resources.

29. The method of claim 28 wherein the fair share of resources for the requestor is determined by dividing the set of resources among a group of requesters.

30. The method of claim 29 wherein the dividing the set of resources among the group of requestors comprises dividing the set of resources equally among all of the requestors in the group of requesters.

31. The method of claim 29 wherein the dividing the set of resources among the group of requestors comprises the steps of:

determining a useable set of resources by subtracting the safety buffer from the set of resources; and dividing the useable set of resources by a known number of requestors from the group.

32. The method of claim 28 wherein the safety buffer of resources is determined by reference to a fraction of the set of the resources.

33. The method of claim 28 wherein the safety buffer of resources is determined by reference to a specific amount of resources.

34. The method of claim 28 wherein the resource is a unit of memory.

35. The method of claim 28 wherein the requester is a networking module.

36. The method of claim 35 wherein the networking module is a wireless network interface.

37. A computer-readable medium having computer-executable instructions for ensuring a fair allocation of a set of resources by reserving a safety buffer of resources, the computer-executable instructions performing steps comprising:

maintaining the safety buffer of resources; and granting a request for a resource if either: (1) a requestor is currently assigned less than a fair share of resources for the requestor and the safety buffer of resources is not empty or (2) a set of available resources is larger than the safety buffer of resources.

38. The computer-readable medium of claim 37 wherein the fair share of resources for the requestor is determined by dividing the set of resources among a group of requestors.

39. The computer-readable medium of claim 38 wherein the dividing the set of resources among the group of requestors comprises dividing the set of resources equally among all of the requestors in the group of requesters.

40. The computer-readable medium of claim 38 wherein the dividing the set of resources among the group of requesters comprises the steps of:

determining a useable set of resources by subtracting the safety buffer from the set of resources; and dividing the useable set of resources by a known number of requesters from the group.

41. The computer-readable medium of claim 37 wherein the safety buffer of resources is determined by reference to a fraction of the set of the resources.

42. The computer-readable medium of claim 37 wherein the safety buffer of resources is determined by reference to a specific amount of resources.

43. The computer-readable medium of claim 37 wherein the resource is a unit of memory.

44. The computer-readable medium of claim 37 wherein the requestor is a networking module.

45. The computer-readable medium of claim 35 wherein the networking module is a wireless network interface.

* * * * *

UNITED STATES PATENT AND TRADEMARK OFFICE
CERTIFICATE OF CORRECTION

PATENT NO. : 6,625,709 B1
DATED : September 23, 2003
INVENTOR(S) : Aiken et al.

It is certified that error appears in the above-identified patent and that said Letters Patent is hereby corrected as shown below:

Title page,
Item [57], ABSTRACT,
Lines 3, 6 and 15, "requesters" should read -- requestors --.

Column 2,
Lines 20, 29 and 41, "requester" should read -- requestor --.
Lines 39 and 45, "requesters" should read -- requestors --.

Column 3,
Lines 7 and 38, "requesters" should read -- requestors --.
Lines 14 and 34, "requester" should read -- requestor --.

Column 4,
Line 19, "requester" should read -- requestor --.

Column 6,
Lines 42 and 43, "requesters" should read -- requestors --.
Lines 50 and 51, "requester" should read -- requestor --.

Column 7,
Lines 1, 8, 28, 41, and 50, "requester" should read -- requestor --.
Line 18, "requesters" should read -- requestors --.

Column 8,
Lines 26, 33, 34, 41 and 64, "requester" should read -- requestor --.
Lines 50, 59 and 67, "requesters" should read -- requestors --.

Column 9,
Lines 4, 36, 54 and 66, "requester" should read -- requestor --.
Lines 23 and 25, "requesters" should read -- requestors --.

Column 10,
Lines 7, 44, 48, 49 and 64, "requester" should read -- requestors --.
Lines 22, 34, 37, 39, 46 and 60, "requesters" should read -- requestors --.

Column 14,
Line 5, "100 KB" should read -- 100KB --.

UNITED STATES PATENT AND TRADEMARK OFFICE
CERTIFICATE OF CORRECTION

PATENT NO. : 6,625,709 B1
DATED : September 23, 2003
INVENTOR(S) : Aiken et al.

It is certified that error appears in the above-identified patent and that said Letters Patent is hereby corrected as shown below:

Column 15,
Lines 19, 51 and 55, "requester" should read -- requestor --.
Lines 21, 58, 60, 61 and 64, "requesters" should read -- requestors --.

Column 16,
Lines 17, 20, 24, 28 and 29, "requester" should read -- requestor --.
Lines 21, 32, 35, 36, and 39, "requesters" should read -- requestors --.

Column 17,
Lines 45 and 49, "requesters" should read -- requestors --.

Column 18,
Line 11, "requester" should read -- requestor --.
Lines 36 and 40, "requesters" should read -- requestors --.

Signed and Sealed this

Third Day of August, 2004

JON W. DUDAS
*Acting Director of the United States Patent and Trademark Office*